United States Patent [19]
Repnik et al.

[11] Patent Number: 5,517,929
[45] Date of Patent: May 21, 1996

[54] THERMAL TREATMENT DEVICE FOR LOOSE MATERIALS

[76] Inventors: Hermann Repnik, Unterdorfstrasse 20, 7760 Radolfzell 18; Werner Astor, Bohringer Strasse 53, both of 7760 Radolfzell, Germany

[21] Appl. No.: 256,201
[22] PCT Filed: Dec. 21, 1992
[86] PCT No.: PCT/EP92/02969
§ 371 Date: Sep. 12, 1994
§ 102(e) Date: Sep. 12, 1994
[87] PCT Pub. No.: WO93/12895
PCT Pub. Date: Jul. 8, 1993

[30] Foreign Application Priority Data

Dec. 31, 1991 [DE] Germany .............. 41 43 260.6

[51] Int. Cl.⁶ .................................................. F23N 5/02
[52] U.S. Cl. .................. 110/190; 110/227; 110/222; 110/293
[58] Field of Search .................. 110/186, 187, 110/190, 222, 224, 227, 228, 273, 275, 291, 342, 293

[56] References Cited

U.S. PATENT DOCUMENTS

| | | | |
|---|---|---|---|
| 3,855,950 | 12/1974 | Hughes, Jr. et al. | 110/186 |
| 4,331,084 | 5/1982 | Fitch et al. | 110/187 |
| 4,385,567 | 5/1983 | Voss | 110/227 |
| 4,563,959 | 1/1986 | Fujiwara | 110/291 |
| 5,161,326 | 11/1992 | Weirich et al. | 110/224 |

Primary Examiner—Henry A. Bennett
Assistant Examiner—Susanne C. Tinker
Attorney, Agent, or Firm—Parmelee, Bollinger & Bramblett; George W. Rauchfuss, Jr.

[57] ABSTRACT

Device for thermally treating loose materials, such as earth, sand, sewage sludge, gravel etc, and, in particular, for sterilizing garden soil and sand used for playing with. The device has a reception device with a surface arrangement having at least one surface section inclined with respect to the horizontal. On this surface section, the loose materials are continuouly supplied by a supply arrangement. A burner arrangement is provided above this surface section which directly fires materials to be treated.

22 Claims, 4 Drawing Sheets

THERMAL TREATMENT DEVICE FOR LOOSE MATERIALS

The present invention relates to a device for thermal treating loose materials, such as, for example, earth, sand, sewage sludge, gravel and the like.

Such a device can be used in the horticulture industry, for example, for sterilising plant earth. The earth used for growing plants is contaminated after use due to microorganisms, fungus, etc. This contamination impairs the growth of the plants and, therefore, must be removed before the earth can be used again.

Against this problem, the horticulture industry normally uses a steaming apparatus having a sealable steaming chamber with a capacity for, for example, 2 $m^3$ earth. Hot steam, generated by a separate steam producer, is introduced into this steam chamber in which the earth is heated up and the microorganisms, etc, are killed. The steaming operation requires around two hours.

This known apparatus has the disadvantage that in order to work reasonably economically, a large steaming chamber is necessary which means a large and heavy construction. Furthermore, despite its large dimension, the possible throughput is relatively low.

It has, therefore, been suggested in DE-OS-2,349,878, to replace the steaming chamber of the above described apparatus with a conveyor belt comprising plate-like conveyor shovels extending in the transverse direction which together with the conveyor belt and a covering, forms respective individual steaming chambers. Steam is produced by a separate steam generator which is introduced into these steam chambers.

This apparatus has, however, the disadvantage that the time period remaining for the steaming process is relatively short so that the danger arises that the earth does not reach the necessary temperature for sterilisation. Furthermore, should the earth become damp from the steam, due to which it has a tendency to stick together, then this can complicate obtaining a sufficient yield of earth and the further processing thereof.

A further application of the apparatus first described above, is the thermal decontamination of grounds of soil, which, for example, are loaded with highly evaporating or heavy decomposing organic harmful substances.

Such an apparatus has become known from DE-OS-3,543,845. With this known apparatus, a rotating drum is filled up with the material to be thermally treated and is here treated by a direct firing. Fuel and oxygen or an oxygen containing gas is fed into the rotating drum for the firing process. This apparatus also has the disadvantage that it is very time consuming and expensive.

Thus, the task of the present invention is to provide a device and a method for thermally treating loose materials, such as earth, sand, sewage sludge, gravel and the like, which has a simple construction and enables an economic thermal treatment of this type of materials.

According to the invention, this task is satisfied by the subject-matter of claim 1.

Preferred embodiments of the device according to the invention is the subject-matter of the dependent claims.

The device of the present invention is provided with a reception device formed as a surface arrangement having at least one surface section inclined with respect to the horizontal. The reception device in total or the horizontal inclined surface section is displaced into vibration by a vibration producing device, preferably a magnetic vibrator or an unbalance motor. The device according to the invention further comprises a supply arrangement which supplies to the reception device and the at least one inclined surface section, the materials to be treated. Due to the inclination of the surface section and the vibrating movement, the loose materials slide along in the direction of the inclination of the surface section. A burner arrangement is provided above this surface section whose flame is directed directly onto the materials to be treated. This arrangement causes the materials which are to be treated to be heated up.

Within the term "loose materials", here it is to be understood that all types of materials which are capable of being shaken or having a granular or powder form is understood, whose structure is so made that the material can carry out a flow-like movement under the influence of gravity and vibration. The term "loose materials" should also cover such types of materials which normally are not capable of being shaken or are granular in form, but which can be brought into a shaken and/or granular form by a corresponding type of apparatus, for example, a commercial apparatus for reducing or breaking down earth soil. Furthermore, the term "loose materials" should also cover materials having different degrees of humidity, that is, dry, as well as, moist materials.

The device according to the invention is particularly suited for sterilising earth. Since the cost of construction of the device according to the invention is considerably lower as the necessary costs of the steam device or the rotating drum, the device can be directly transported to the respective plane for use. Furthermore, since the earth is fired directly by the flame of the burner arrangement, it will very quickly reach the necessary temperature for sterilisation. As a result, the throughput reached per unit of time is a number of times higher than with conventional steam systems.

The significant difference compared to using of a steam device having a steam chamber is that the method can be carried out continuously. The loose material to be treated is constantly supplied to the reception device via the supply arrangement and can be directly taken from the device after passing through the flame of the burner arrangement.

A further important application of the device of the invention is to sterilise sand. Numerous tests of the quality of the sand in sand boxes in nursery schools, public playing parks for children, etc, have shown that after a short period of use, fresh sand is also contaminated to high degree by microorganisms, which are caused by animal and human excrement in the sand. These contaminations present a considerable danger to the health of small children who use this sand for playing.

The device according to the invention is particularly well suited to treat such types of sand that the entire microorganisms are reliably killed.

The device of the invention is further particularly suitable for drying sewage sludge which, for example, is obtained in large quantities from the operation of cleansing works. Sewage sludge has normally a high content of moisture and, therefore, must be dried before the further processing or before being possibly deposited. In this case, the sewage sludge is preferably fed via a reducing apparatus to the device of the invention where it will be dried. Besides the process of drying, microorganisms which are present are, at the same time, killed.

The device of the invention is furthermore suited to processing or working on contaminated grounds. At the same time, a device can be provided, as also for the other possible applications of use as described above, which can eventually capture and further process gases which result from the firing in order to prevent uncontrolled output of gases which are harmful to the environment.

The burner arrangement must be so dimensioned that the total amount of heat produced is sufficient in order to heat the materials to be treated up to the desired temperature. In this case, fluid fuel, as well as also fuel in the form of gas, can be used to operate the burner arrangement. However, the application of burner arrangements have shown that those which are driven with a combustible gas-air or gas-oxygen mixture are particularly advantageous. Preferably, the burner arrangement is so formed that it comprises of one or more burner rails which are arranged over the reception device substantially transverse to the direction of movement of the materials to be treated. The burner rails have preferably a plurality of gas output openings so that it is possible to have an equal heat development over the total width of the surface section. Particularly preferred, is the use of burners comprising a plurality of individual burner heads arranged next to each other which are supplied by a common supply cannal with a combustible gas-air or gas-oxygen mixture.

Trials have shown that it is particularly preferred to incline the surface section of the reception device to around 10° with respect to the horizontal when loose earth is being treated. This surface section, inclined substantially along the length direction of the reception device, can comprise of a plate made from metal, preferably steel, in order to withstand the temperature of the flames. Instead of using a steel plate, it is also possible to use a ceramic plate or a steel plate having a ceramic covering.

According to a preferred embodiment of the device of the invention, the reception device comprises two or more surface sections each separated from one another by a step. The step causes the materials to be treated to flow in a particularly defined manner of flow from the first surface section to the second surface section. When, according to a further preferred embodiment, the burner arrangement is fixed directly in the region of this step, a particularly equal and easy reproducible flow of heat is obtained at the spot where the materials are to be treated.

The supply arrangement which substantially continuously supplies the goods to be treated to the reception device is preferably formed so that a predetermined amount of the materials to be treated is supplied equally over the width of the reception device per unit of time.

According to another preferred embodiment, the supply of the materials to be treated takes place in a measured way such that the amount of supplied material changes. When the amount of material to be treated supplied per unit of time can be controlled, then this control is preferably carried out in a closed control loop. This can take place through corresponding sensors which monitor the thickness of the layer of material located on the inclined surface section. As soon as the thickness of the layer deviates from a predetermined value, the supplied amount is either increased or decreased according to the deviation.

The amount supplied per unit of time can also be controlled by the supply arrangement. In the case that the supply arrangement comprises a funnel tube, according to a preferred embodiment, sensors are arranged in the funnel tube which indicate the fill condition. The supply of materials into the funnel tube, which according to a preferred embodiment is by means of a conveyor belt, is stopped as soon as the amount of material lies over a predetermined limit value, and is again restarted as soon as this amount lies below a predetermined limit value.

Particularly preferred is, however, a temperature control.

For controlling the temperature, temperature sensors are used which are arranged in the reception device and which, for example, detect the temperature of the inclined surface section close to or next to the burner arrangement or, the temperature of the materials to be treated after the passage through the burner arrangement.

In case the measured temperatures lie over a predetermined limit value more materials per unit of time can be supplied. Should the measured temperatures lie below this limit value, then the supplied amount of materials to be treated per unit of time is reduced.

A corresponding control can also be carried out with the burner arrangement, both as well as with a supply arrangement which is not controlled as also with a controlled supply arrangement. In this case, the gas amount supplied to the burner is increased when the temperatures measured fall below the limit value and vice versa.

Through the temperature related control carried out by way of the amount of materials supplied and/or the burner output, it is guaranteed that the temperature obtained within the device is sufficient in order to ensure the desired success of the thermal treatment. With this arrangement, a safe functioning of the device according to the invention is ensured without requiring the service of particularly qualified technical operators.

The best results achieved with the method of the invention is when the material to be treated slides along the surface section or the inclined surface section with a substantially constant speed. This equal movement is achieved particularly when the material to be processed is more or less homogeneous with respect to its nature, for example, its grain size, etc. Therefore, the supply arrangement preferrably has pre-attached a reducing device which, for example, reduces the earth taken from the plant bed down to a predetermined grain size. Such reducing devices which partially allow an adjustment of the corn size are available in the trade. Preferably, the reducing device is directly connected with the supply arrangement via a corresponding conveyor apparatus, for example, a conveyor belt or the like. The reducing device and the supply conveyor can also be formed as one unit.

Further advantages, features and application possibilities of the present invention are disclosed in the following description with reference to the enclosed drawings.

Figure 1:
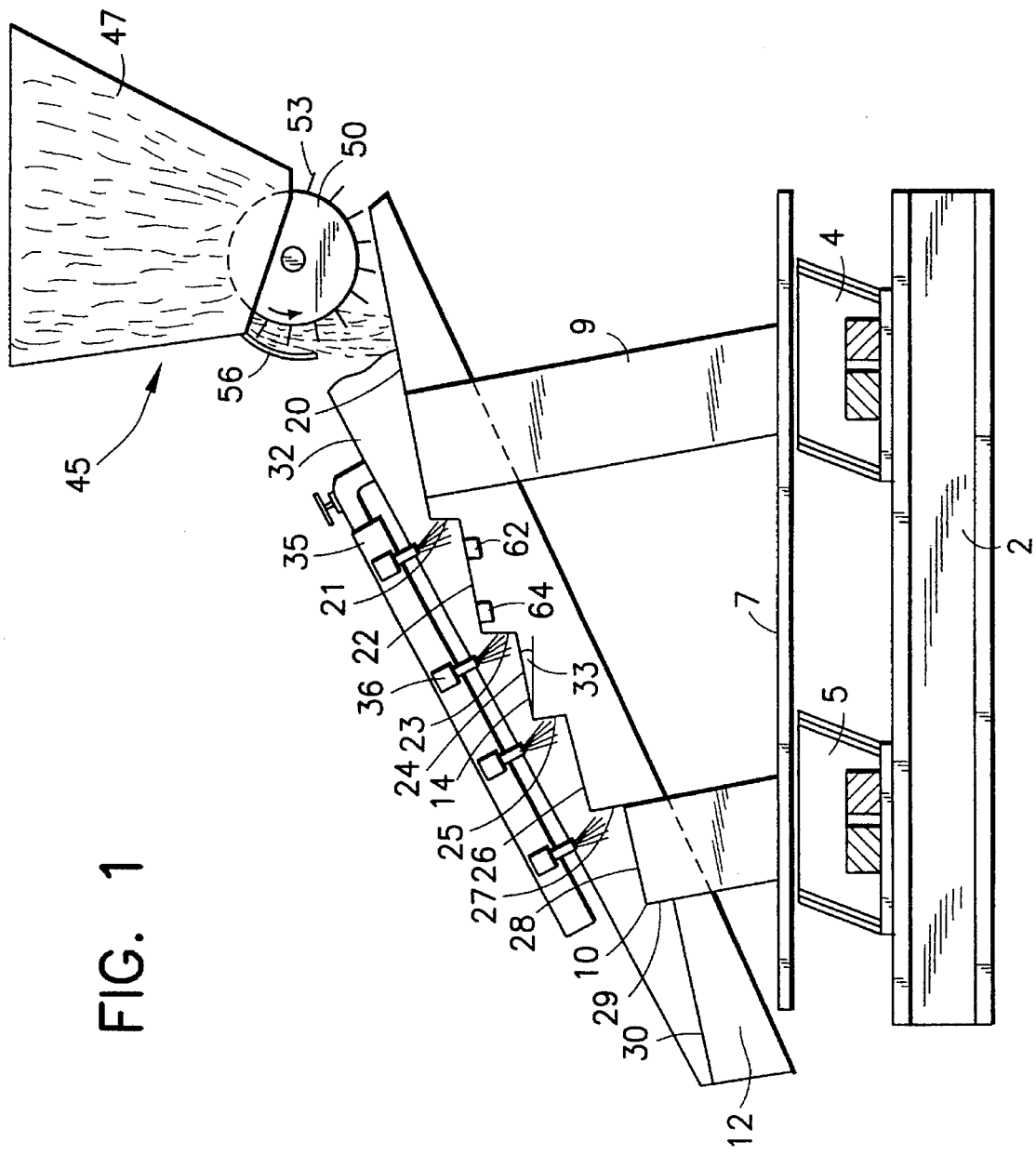
FIG. 1 shows a schematic side sectional view of a first embodiment of the device according to the invention, seen along lines I—I in FIG. 2.

An embodiment of the device of the invention will now be described in reference to FIGS. 1 to 3. This embodiment is concepted as a mobile earth sterilisation device, however, it can also be employed in a similar manner of construction as a device for sterilising sand and as a device for the thermal treatment of contaminated earth.

The embodiment as shown has a main frame 1, not shown in the drawings, on which a stabilising mass 2 is fixed, for example, by welding. In this example, the stabilising mass 2 is made from a I-carrier.

On this I-carrier, two commercial magnetic vibrating bodies 4, 5 are fixed which are supplied with an outside electric voltage and vibrate with a predetermined frequency. The magnetic vibrating bodies vibrate preferrably with a frequency between 20 and 100 Hz, in particular, they vibrate preferrably with a frequency from around 50 Hz. Instead of these magnetic vibrating bodies, other vibrating producing devices can also be used as, for example, unbalanced motors or the like.

A flat carrier 7 is fixed on the magnetic vibrating bodies by way of a screw connection and has two supports 9, 10 arranged thereon for supporting the reception device 12. The supports 9 and 10 are formed as a four sided pipe. It is favourable when these supports are turned out to incline with the same angle as the surface sections of the reception device. Instead of this inclined arrangement, it is, of course, also possible to have an upright arrangement of the supports 9 and 10.

The reception device 12 has a step plate 14 whose total length in this embodiment amounts to 1.4 m. The width of the step plate in this embodiment is 0.5 m.

The step plate has a first surface section 20, a first step 21 connecting therewith, a second surface section 22 connecting with said first step 21, a step 23 connecting with said second surface section, a third surface section 24 connecting with said second step 23, a step 25 connecting with said third surface section, a fourth surface section 26 connecting with said third step 25, a step 27 connecting with said fourth surface section, a fifth surface section 28 connecting with said step 27, a fifth step 29 connecting with said fifth surface section, as well as, a sixth surface section 30. The first to fifth surface sections are arranged parallel to each other and are inclined around 10° with respect to the horizontal, as shown by the angle 33 with the third surface section 24.

The steps each extend perpendicular to the arranged surface sections and have, in this embodiment, a height of 3.5 cm. The step plate is finished completely out of steel.

Figure 3:
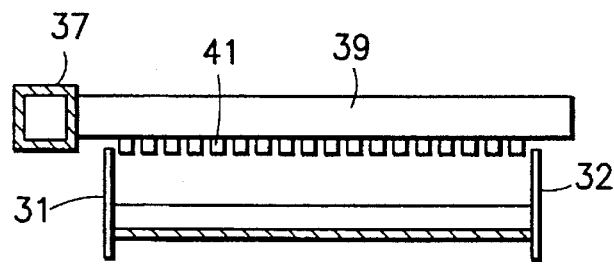
FIG. 3 shows a schematic partial section of the embodiment according to FIG. 1 whereby the section is cut transverse to the direction of movement of the material to be treated.

As can be seen, in particular from FIG. 3, side wings 31, 32 are arranged on both sides of the step plate which prevent the slipping down onto the sides of the material to be treated.

Above the step plate 14, a burner arrangement 35 is arranged which, in this case, has four burner rails 36 which are connected to each other via a common gas supply pipe 37. The gas supply pipe 37 is connected by way of corresponding valves to a gas supply device comprising, for example, a pressure gas bottle and a pressure air bottle. The combustible gas and the air are mixed together with a predetermined ratio and is supplied to the pipe 37 via a pressure regulation device.

Each burner rail 36 consists of a four sided pipe 39 closed on one side whose other side is connected with the gas supply pipe 37 in such a way that there arises a gap flow connection between the supply pipe and the burner rail. A plurality of individual burner nozzles 41 are screwed into the burner rail and are formed as the so called two chamber nozzle. With this type of nozzle, the amount of gas supplied serves at the same time to cool the nozzle. A construction of this manner allows a flame temperature of over 1500° C. to be reached.

The supply arrangement, indicated in full with reference number 45, is arranged above the step plate 14 and as well over the first surface section 20. The supply arrangement 45 comprises a funnel tube 47 in which the material to be treated is introduced. The funnel tube is preferably connected in series with a commercial reducing device which reduces the material to be treated with a predetermined, adjustable grain size. The reducing device can be directly connected with the funnel tube, for example, by way of a conveyor belt. The reducing device and the funnel tube can also be combined with one another in which the reducing device is directly integrated in the funnel tube.

In the lower end region of the funnel tube, a measuring drum 50 is rotatably fixed which is driven by an electric motor having changeable speed of rotation. The measuring drum 50 has a cylindrical body 51, for example, made out of a steel sheet and whose cylindrical axis forms at the same time the rotating axis of the measuring drum. Parallel to the cylindrical axis are distributed a plurality of flat plates 53 around the circumference of the cylinder between which a respective chamber 54 is formed. The funnel tube has, furthermore, on its lower side, a cylindrical formed stripping sheet 56 whose cylindrical radius corresponds to the radius of the outer edges of the plates of the measuring drum. The width of the measuring drum corresponds substantially to the width of the step plate 14.

Figure 2:
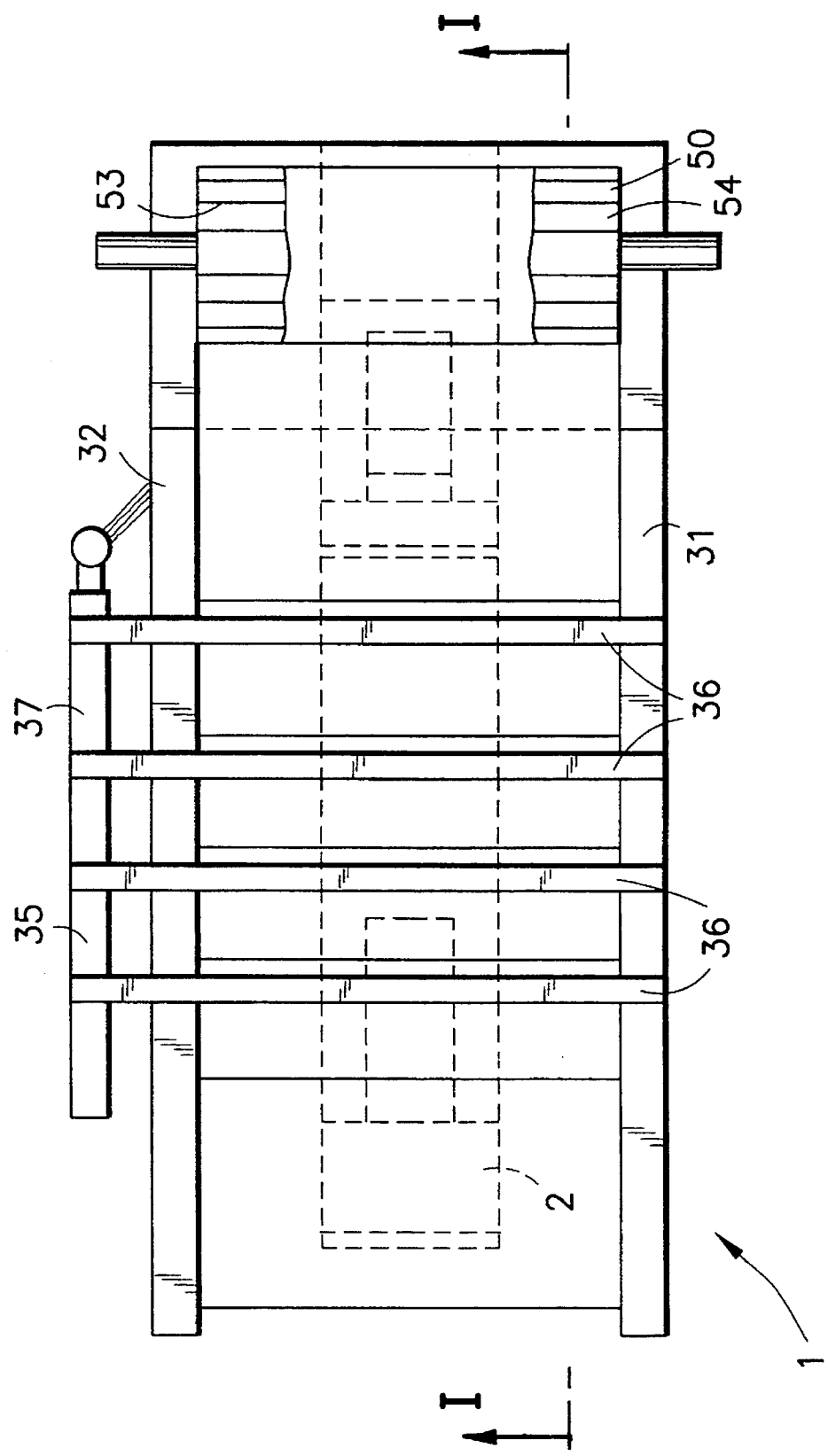
FIG. 2 shows a schematic top view of the embodiment according to FIG. 1 whereby the section viewed is above the measuring drum.

In an alternative embodiment, which as far as the construction is concerned corresponds to the device according to FIG. 1, the measuring drum 50 can be omitted. In this case, instead of the measuring drum, sensors are arranged in the funnel tube 47 which detect the filling condition of the material in the funnel tube. These sensors output an electrical signal which controls a conveyor belt through a control device (not shown) which supplies the material to the funnel tube 47. As soon as the amount found in the funnel tube rises above a predetermined limit value, the conveyor belt is stopped. The amount located in the funnel tube 47 is, due to gravity, gradually moved onto the surface arrangement until the available amount of material in the funnel tube reaches a lower limit value. The conveyor belt is then restarted and supplies again the material to the funnel tube 47. With this embodiment, the supply of the loose material from the funnel onto the first surface section 20 happens exclusively due to the force of gravity. The funnel is, therefore, so arranged that its lower edge is arranged proportionally thick over the plate 20 and is substantially parallel to this plate so that due to the combination effect of the force of gravity and the influence from the vibrating movement of the plate 20, a continual flow of material is carried out.

For monitoring the temperature of the device, a number of temperature sensors are provided which are either directly recessed in the step plate or arranged on the underside of the step plate. The temperature sensors 62 are arranged in the region where they meet the burner flame on the step plate. Furthermore, the temperature sensors could also be provided in the region of the step plate which is not disturbed from the burning flame, which region is indicated by the reference number 64. To regulate the temperature of the device, a control device is provided which is indicated in total with reference number 70. This control device has a signal processing device 71, to which is fed the signals of the temperature sensors 62 and/or 64, as well as the signal of an impulse transmittor 65, and which is connected with the measuring drum and detects its speed of rotation. The signal processing device amplifies and digitises the received signals.

The signal processing device 71 is connected with a microprocessor device 73 which is controlled by a programme stored in the memory 74. The microprocessor device 73 is furthermore provided with an input and output device 75. The microprocessor device generates control signals which are supplied to one or more gas controlled devices 80 and a speed of rotation control device 82 via a control signal processing device 77.

The function of this device with respect to a sterilising device for earth, will now be explained in reference to FIGS. 1 to 6. The device has a corresponding function when, for example, used as a device for sterilising sand in sand boxes and the like.

The fine grained, crushed up earth from a disintegrating or reducing device, is filled into a funnel tube by way of a conveyor belt whereby, at the same time, the step plate is displaced into vibration by vibrating producing devices. As such, the speed of supply is measured such that at least the lower region of the funnel is filled with earth. The earth lies against the measuring drum 50 and fills the chambers 54 arranged between the plates 53. By rotating the measuring drum, which as shown in FIG. 1 is carried out anti-clockwise, the earth located in the chambers 54 is pushed out of the funnel and folds onto the first surface section 20 of the step plate 14. As well, the stripping plate 56 prevents more earth being pushed out of the funnel as that amount corresponding to the volume of the chamber 54 per corresponding angular movement of the measuring drum.

On the basis of the construction of the measuring drum, which has the same width as the step plate 14, it is ensured that the earth is brought equally fully over the complete width of the step plate. Due to the vibration of the step plate, an equally thick sheet forms which moves slowly downwards, that is, in FIG. 1 towards the left hand side, due to the inclination of the individual surface sections of the step sections.

Figure 6:
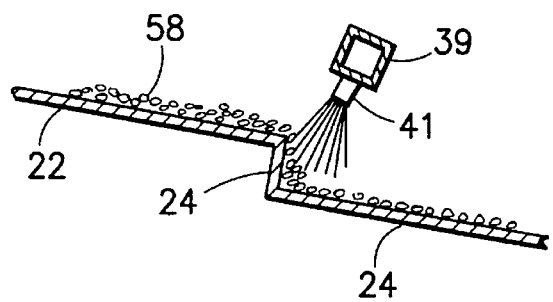
FIG. 6 shows a principle representation for explaining the function of the embodiment according to FIGS. 1 to 5.

As schematically shown in FIG. 6, the earth is located in direct contact with the burner flame when passing over the steps. As a result, the earth is heated up very intensely and the microorgansims, fungus, etc, are killed.

In this embodiment, four burner rails are switched on one after the other, so that the individual pieces of earth are exposed four times to the heating up process. Therefore, a very reliable sterilisation is effected.

Apart from this, through the layer of earth sliding along on top of the step plate, the step plate is protected itself from excessive heating up. It is, therefore, possible to form the step plate out of a steel sheet. Instead of this, a ceramic material or a plate covered with the ceramic can also be used.

At the lower end of the step plate, that is the left end in FIG. 1, the earth falls from the step plate and can be collected or transported away by a further conveying device.

Tests have shown that the device of the type being described here also function without the use of a control device so that the device can be made available at a favourable price for the horticulture industry and the like.

The use of the described control device has, however, the advantage that an optimal efficiency and an optimal throughput for the system can be achieved with such a device.

By way of the control device, the amount of earth supplied and the output or power of the burner are directly influenced. When the temperatures, measured with the temperature sensors 62, 64, lie below predetermined limit values, the power of the burner is either too low or the amount of earth outputted by the measuring drum is too great. The control device will then at first increase the power of the burner up to a maximum value and, in the case that this is not sufficient in order to reach the desired temperature, then reduce the speed of rotation of the measuring drum and with it the supplied amount of earth per unit of time.

If the temperature is too high, the speed of rotation of the measured drum is increased and with it the thickness of the layer of earth on the step plate is increased. In the case that this is not sufficient, or due to other kinds of influences, the temperature of the step plate is too high, the power of the burner arrangement is correspondingly reduced whereby damage to the step plate is also avoided.

Instead of the control device described above, a control device can also be used which is simply provided with a temperature limit switch to switch off the burner arrangement by high temperatures, and the control of the temperature is carried out exclusively via the control of the speed of rotation of the measuring drum.

The efficiency of the above described embodiment has been monitored by comparative tests.

As such, a first part of a sample of earth was treated in a conventional steam device for two hours at 100° C. A second part of the sample was treated with the device according to the invention. The rest of the sample remained without any treatment.

By an examination in an independent biological institute, it was determined that in the untreated earth, fungus of the species Rhizopus, Mucor, Verticillium were present.

In the sample of the earth which was flame treated according to the invention and in the sample of earth which had been steamed, none of these species were to be found.

While from the sample of earth which was not treated plant weeds developed, for the steamed earth and the flame treated earth no growth of any plant could be observed.

In reference to FIGS. 7 and 8, two alternative embodiments of the step plate 14 will now be described.

Figure 7:
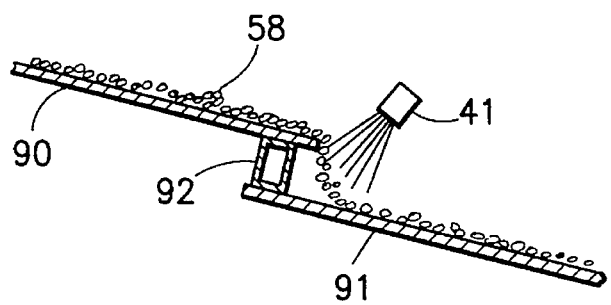
FIG. 7 shows an alternative embodiment of the step plate 14 according to the embodiment of FIGS. 1 to 5.

With the embodiment according to FIG. 7, the step plate has a first surface section 90 which is inclined 10° to the horizontal, and next to which a second surface section 91 is arranged in parallel. Both surface sections are welded together with a four edge profile 92. With this arrangement, a piece of the first surface section 90 projects over the four edge profile 92 such that it results in a free fall possibility for the earth which is flowing over, as is schematically represented in FIG. 7.

Figure 8:
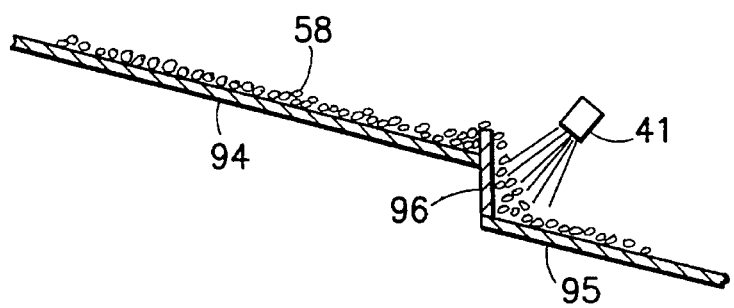
FIG. 8 shows an alternative embodiment of the step plate 14 according to the embodiment of FIGS. 1 to 5.
Figure 4:
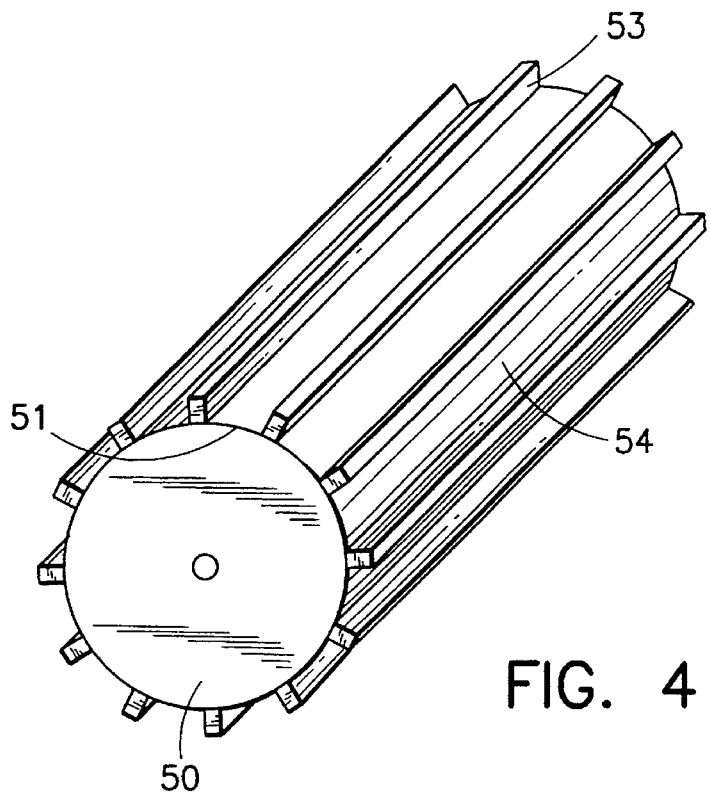
FIG. 4 shows a schematic, perspective view of the measuring drum for the embodiment according to FIG. 1.
Figure 5:
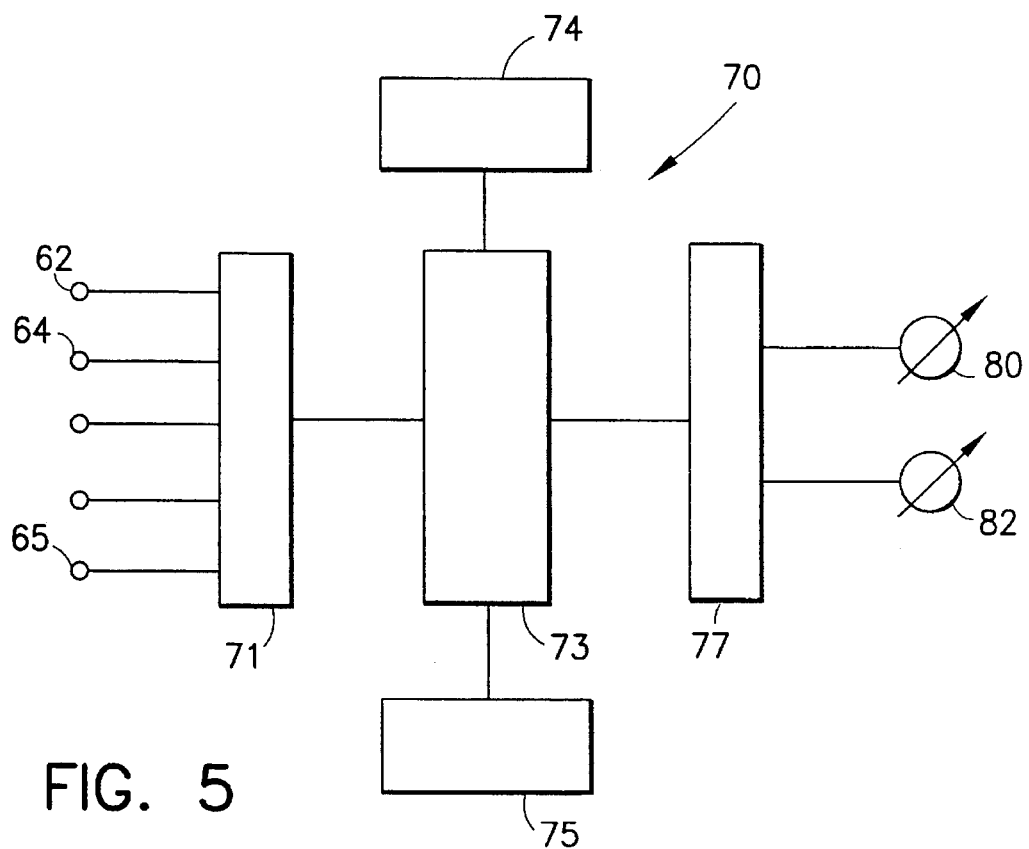
FIG. 5 shows a schematic block diagram of a control device for controlling the device according to the embodiment of FIGS. 1 to 4.

With the embodiment according to FIG. 8, the step plate has a first surface section 94 and a second surface section 95 arranged parallel thereto. Both surface sections are inclined around 10° to the horizontal.

The first surface section and the second surface section are connected with one another with a vertical plate 96 which projects over the upper surface of the first surface section 94. With such an arrangement, a projecting portion is formed, as is schematically shown in FIG. 8, which stops at first the earth 58 sliding along the upper surface of the surface section 94. As soon as a certain level is reached, the upper grains of the earth can overcome this obstructing device due to the vibration of the step plate and fall onto the step plate 95.

It is pointed out that the plate 96 must not necessarily be arranged in the vertical direction. The plate can also be arranged upright to the surface section 95, that is, it will be likewise inclined around 10° to the vertical. However, it is likewise possible to arrange this plate such that it has an inclination to the horizontal which lies between 20° and 80°. Such an inclination of the single step can be realised with the construction according to FIGS. 1 to 6.

With the device according to FIG. 1, four burner rails 36 are arranged. Tests have shown that with an application of the device for thermally treating sand of sand boxes and for drying the sewage sludge, it is favourable to have a greater number of burner rails. A sample from the sand box was examined by an independent institute, which was treated with the device according to FIG. 1, in which seven burner rails 36 were arranged parallel to one another. The examination produced the result that the sand previously strongly contaminated by microorganisms and worm eggs was in a complete hygienic condition after the treatment, which is significantly better than the condition of fresh delivered, i.e.

"new" playing sand. As well, these tests have shown that the device alone can still deliver very good results, when the sand, for example, is moist due to rain.

If the device is used to dry sewage sludge, the number of burner rails is measured according to the desired dry result. It has been shown that likewise with seven burner rails, which are arranged parallel to one another, a considerable drying of the sewage sludge is possible.

We claim:

1. Device for thermally treating loose materials and having a reception device for receiving the loose material and a burner arrangement which directly fires the loose materials to be treated, said device for thermally treating loose material comprising:

a supply arrangement for continuously supplying the loose material to the reception device;

said reception device has a surface arrangement having at least two surface sections inclined with respect to the horizontal whereby a lower end of a first surface section seen in a direction of movement of the loose material is arranged vertically over a beginning of an upper end of the second surface section in such a way that loose material moving on the first section reaches the second surface section from said first surface section and whereby in said surface arrangement of the reception device a step plate forms a transition connecting one inclined surface section to an adjacent following inclined surface section of said at least two surface sections;

a vibration producing device connected to said reception device surface arrangement for producing a vibrating motion in said at least two surface sections whereby loose material is movable along the inclination of said at least two surface sections;

a burner arrangement located at and above the transition from one inclined surface section to an adjacent following inclined surface section, said burner arrangement comprising at least one burner rail extending substantially transverse to the direction of movement of the loose material and a plurality of output openings for directing a burning flame onto loose materials to be thermally treated as the loose materials flow over said transition from one inclined surface section to an adjacent following inclined surface section of said surface arrangement.

2. Device according to claim 1, characterised in that at least three surface sections are provided arranged one after the other seen in the direction of movement of loose materials.

3. Device according to claim 2 characterised in that the burner arrangement comprises at least 2 burner rails.

4. Device according to claim 2 characterized in that the burner arrangement comprises at least 3 burner rails.

5. Device according to claim 1, characterised in that the inclination of said surface sections with respect to the horizontal amount to between 5 and 15 degrees.

6. Device according to claim 5, characterised in that said supply arrangement comprises a measuring drum, integrated with a stripping device and which extends substantially transverse to the direction of movement of said loose materials on the surface arrangement, whereby the said measuring drum has a cylindrical body having a plurality of plate sections provided thereon which extend parallel to the axis of the cylindrical body and form a respective chamber for receiving the loose materials.

7. Device according to claim 6, characterised in that the measuring drum can be driven at different speeds of rotation by means of a driving device.

8. Device according to claim 7, characterised in that the supply arrangement has a hopper, and that said measuring drum is rotatably fixed in the region below said hopper.

9. Device according to claim 5, characterised in that the supply arrangement has a hopper arranged above the said surface arrangement.

10. Device according to claim 9, characterised in that a first sensor is arranged in said hopper which outputs an electrical signal to a control device, when the hopper is filled to a predetermined maximum filled condition as well as a second sensor which outputs a signal to the control device when the filling condition of the loose materials in the hopper reaches a predetermined minimum value, and that the supply arrangement further comprises a conveying arrangement which is controlled by said control device in such a way that the filling condition of the loose materials in the hopper during operation is found to be between said predetermined minimum and said predetermined maximum value.

11. Device according to claim 10, characterised in that said vibrating producing device comprises an unbalanced rotating body.

12. Device according to claim 11, characterised in that the reception device is made from a step plate formed as a single piece having side plates in order to prevent a sliding off of the loose materials transverse to the direction of movement, and that said step plate is fixed by means of supports onto a main body whereby said vibrating producing device is provided between said supports and said main body.

13. Device according to claim 12, characterised in that a control device is provided which controls at least one of: the speed of rotation of said measuring drum and the power output of the burner arrangement.

14. Device according to claim 13, characterised in that the control device is connected with temperature sensors which are located in said surface sections in the region of said burner arrangement and with an impulse transmitter for detecting the speed of rotation of the measuring drum.

15. Device according to claim 14, characterised in that said burner arrangement is operable with a gas-air or gas-oxygen-mixture.

16. Device according to claim 10, characterised in that said vibration producing device is electromagnectically operated and vibrates with a frequency between 25 and 100 Hz.

17. Device according to claim 16 wherein the vibration producing device vibrates with a frequency between 45 and 55 Hz.

18. Device according to claim 5 wherein the inclination of said surface sections with respect to the horizontal amounts to between 9 and 11 degrees.

19. Use of the device according to claim 1, for sterilizing earth.

20. Use of the device according to claim 1, for sterilizing sand from sand boxes as is used in childrens playing grounds.

21. Use of the device according to claim 1, for drying sewage sludge.

22. Use of the device according to claim 1, for thermally decontaminating contaminated earth soil.

* * * * *